(12) United States Patent
Tanimoto (10) Patent No.: US 7,631,049 B2
(45) Date of Patent: Dec. 8, 2009

(54) CONTENT PROVIDING DEVICE AND DEVICE FOR BROWSING PROVIDED CONTENT

(75) Inventor: Yoshifumi Tanimoto, Hirakata (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 1092 days.

(21) Appl. No.: 10/810,594

(22) Filed: Mar. 29, 2004

(65) Prior Publication Data
US 2004/0225741 A1 Nov. 11, 2004

(30) Foreign Application Priority Data
May 9, 2003 (JP) .............. 2003-132333

(51) Int. Cl.
*G06F 15/16* (2006.01)
*G06F 15/173* (2006.01)

(52) U.S. Cl. .............. 709/207; 709/204; 709/206; 709/224; 709/246

(58) Field of Classification Search ........... 709/204, 709/206, 207, 224, 246
See application file for complete search history.

(56) References Cited

U.S. PATENT DOCUMENTS

| 5,818,616 | A * | 10/1998 | Kawai .................... 398/72 |
| 5,848,415 | A * | 12/1998 | Guck ..................... 707/10 |
| 6,016,478 | A * | 1/2000 | Zhang et al. ............... 705/9 |
| 6,343,313 | B1 * | 1/2002 | Salesky et al. ............ 709/204 |
| 6,363,352 | B1 * | 3/2002 | Dailey et al. ............... 705/9 |
| 6,434,599 | B1 * | 8/2002 | Porter .................... 709/204 |
| 6,636,888 | B1 * | 10/2003 | Bookspan et al. .......... 709/203 |
| 6,732,103 | B1 * | 5/2004 | Strick et al. ............... 707/10 |

FOREIGN PATENT DOCUMENTS

| JP | 07-210357 A | 8/1995 |
| JP | 8-286802 | 11/1996 |
| JP | 2002-41429 | 2/2002 |
| JP | 2002-041429 A | 2/2002 |
| JP | 2002-108184 A | 4/2002 |
| JP | 2002-149640 A | 5/2002 |
| JP | 2003-016020 A | 1/2003 |

OTHER PUBLICATIONS

Japanese Decision of Refusal dated Feb. 20, 2007, issued in corresponding Japanese patent application No. 2003-132333.
Notification of Reason(s) for Refusal dated Aug. 1, 2006, issued in corresponding Patent Application No. 2003-132333.

* cited by examiner

*Primary Examiner*—Ario Etienne
*Assistant Examiner*—Hussein Elchanti
(74) *Attorney, Agent, or Firm*—Westerman, Hattori, Daniels & Adrian, L.L.P.

(57) ABSTRACT

A teleconference system is large-scale. In the present invention, an IM server provides instant message service to a first client, a second client and a content providing device. The first client adds position information of a first cursor to an instant message and transmits the instant message to the content providing device. The content providing device transmits an instant message including the position information to the second client which displays the same content as the first client. The second client draws a third cursor at a position on the content specified by the position information. Accordingly, a conference or a meeting with a person at a remote location can be carried out by a relatively small system architecture.

12 Claims, 5 Drawing Sheets

CONTENT PROVIDING DEVICE AND DEVICE FOR BROWSING PROVIDED CONTENT

BACKGROUND OF THE INVENTION

1. Field of the Invention

The present invention relates to technology for providing and browsing content, and more particularly to technology for browsing the content by a plurality of browsing devices for a conference.

2. Description of the Related Art

There is a teleconference system for having a conference or a meeting with a person at a remote location. The teleconference system enables participants to feel as though they are actually attending a live conference just by talking to another participant displayed on a screen. Materials or the like to be used in the conference are also displayed on a television (TV) screen. There is technology which provides such materials used in a teleconference via a network all at once.

Such a teleconference system is large-scale. In most cases, a conference or a meeting with a person at a remote location can be done just by looking at common materials and talking over the telephone.

SUMMARY OF THE INVENTION

The present invention was made in view of such a circumstance. An advantage of the present invention is that it provides technology for holding a meeting with a person at a remote location.

An aspect of the present invention is a device that provides content. The device includes a providing unit that provides prescribed content to a client, a receiving unit that receives a message that includes position information which specifies a prescribed position on the content, an extracting unit that extracts the position information from the message and a transmitting unit that transmits the message including the extracted position information to another client which is browsing the content.

Accordingly, a content providing device can notify a position on the content indicated by a first user browsing the content to a second user browsing the content. The "content" is a file handled by the device. For example, the content is digital data including a character string, an image, a voice or the like. The "position information" is a position on the displayed content when a prescribed process is executed on the digital data, which is the content, and the digital data are displayed. The "message" is information transmitted according to communication protocol such as the Instant Messaging and Presence Protocol (IMPP) and the Hyper Text Transfer Protocol (HTTP)

Another aspect of the present invention is a device that obtains and displays content. The device includes an obtaining unit that obtains desired content from a providing device that provides content, a display unit that displays the obtained content and that displays on the content, a cursor movable according to an instruction from a user, an obtaining unit that obtains position information of the cursor on the content, and a transmitting unit that adds the obtained position information to a message and transmits the message to the providing device. Accordingly, the device can notify the position information of the cursor by a message.

Another aspect of the present invention is a device that obtains and displays content. The device includes an obtaining unit that obtains prescribed content from a providing device that provides content, a receiving unit that receives a message including position information from the providing device, and a display unit that displays a cursor on the content in accordance with the obtained position information. Accordingly, a cursor can be displayed on the content in accordance with the position information included in the message.

Any conversion of the combination of the above constituent elements or the expression of the present invention between a method, a device, a system, a recording medium, a computer program or the like is also effective as an aspect of the present invention.

According to the present invention, holding a meeting by looking at the same content can be established by a relatively small-scale system.

DETAILED DESCRIPTION OF THE PREFERRED EMBODIMENTS

First Embodiment

Figure 1:
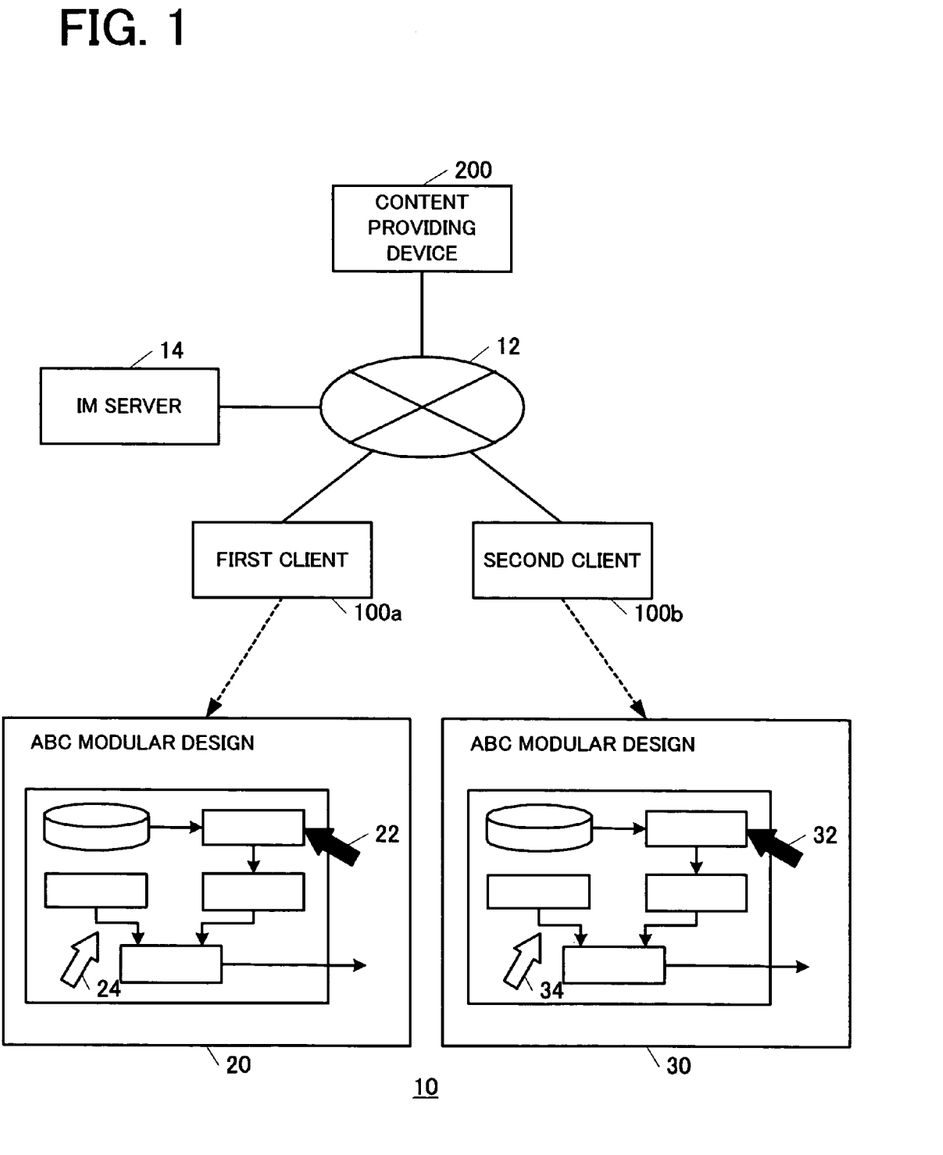
FIG. 1 is a block diagram of a content providing system according to a first embodiment of the present invention.

FIG. 1 is a block diagram of a content providing system 10 according to a first embodiment of the present invention. In the content providing system 10, for example, users at remote locations can hold a meeting by using a telephone or the like while looking at the same references. A display screen 20 is an example of a display screen displayed to a first client 100a. A display screen 30 is an example of a display screen displayed to a second client 100b. As shown in FIG. 1, the same content is displayed at the first client 100a and at the second client 100b.

A first cursor 22 is a mark which can be moved by a user of the first client 100a (hereinafter referred to as the "first user") to point to a position of the content in the display screen 20. A third cursor 32 displayed in the display screen 30 is displayed at the same position as the position of the first cursor 22 on the content in the display screen 20. The third cursor 32 moves in response to the movement of the first cursor 22.

A fourth cursor 34 is a mark which can be moved by a user of the second client 100b (hereinafter referred to as the "second user") to point to a position of the content in the display screen 30. A second cursor 24 displayed in the display screen 20 is displayed at the same position as the position of the fourth cursor 34 on the content in the display screen 30. The second cursor 24 moves in response to the movement of the fourth cursor 34.

By using two types of cursors which can be moved by each of the users of the first client 100a and the second client 100b respectively, the users can hold a meeting by pointing a prescribed part of the content displayed in the screens. As another example, a meeting can be held by two or more users. In this case, cursors having different shapes are displayed for each of the users.

An instant message server 14 (hereinafter referred to as the "IM server 14") is a server that provides instant message service (hereinafter referred to as the "IM service"). For example, the IM service includes service for providing information indicating whether or not a user of the IM service (hereinafter referred to as the "IM user") can transmit and receive a message (hereinafter referred to as the "presence service"), and service for communicating a message between the IM users (hereinafter referred to as the "message service"). The "instant message" can be a generic name of the presence service and the message service, or can be indicating one of the presence service and the message service. In short, the instant message is information transmitted and received in the IM service. The instant message will be referred to simply as the "message". The IM user can use the IM service by using an instant message client (hereinafter referred to as the "IM client"). In the following, the status when the IM user is logged in the IM server 14, in other words, the status when a message can be transmitted and received, will be referred to as an "active status".

In the IM service, a message is transmitted and received when the IM user is under the active status. Therefore, the IM server 14 does not include a mechanism for temporarily storing a message explicitly as in a mail server used in the Simple Mail Transfer Protocol (SMTP) or the Post Office Protocol (POP). Thus, a message is immediately notified to the IM client of the IM user, which is a destination, and a push-typed notification can be carried out. The IM server 14 can be an existing server that provides the IM service, or the IM server 14 can be newly provided. Moreover, a content providing device 200 can include the IM server 14.

The content providing device 200 provides content to the first client 100a and the second client 100b. The IM server 14 establishes a connection with the content providing device 200, the first client 100a and the second client 100b via a network 12. The first client 100a, the second client 100b and the content providing device 200 each include a function as an IM client of the IM server 14.

The first client 100a and the second client 100b notify the content displayed in the display screen 20 and position information of each of the cursors by using an instant message. For example, when the first cursor 22 is moved, the first client 100a adds position information of the first cursor 22 on the content to an instant message, and transmits the instant message to the content providing device 200.

Then, the content providing device 200 transmits the instant message including the position information to the second client 100b that is browsing the same content. The second client 100b draws the third cursor 32 on the content in accordance with the instant message. Accordingly, the cursors can be displayed on the content as shown in the display screen 20 and the display screen 30.

Figure 2:
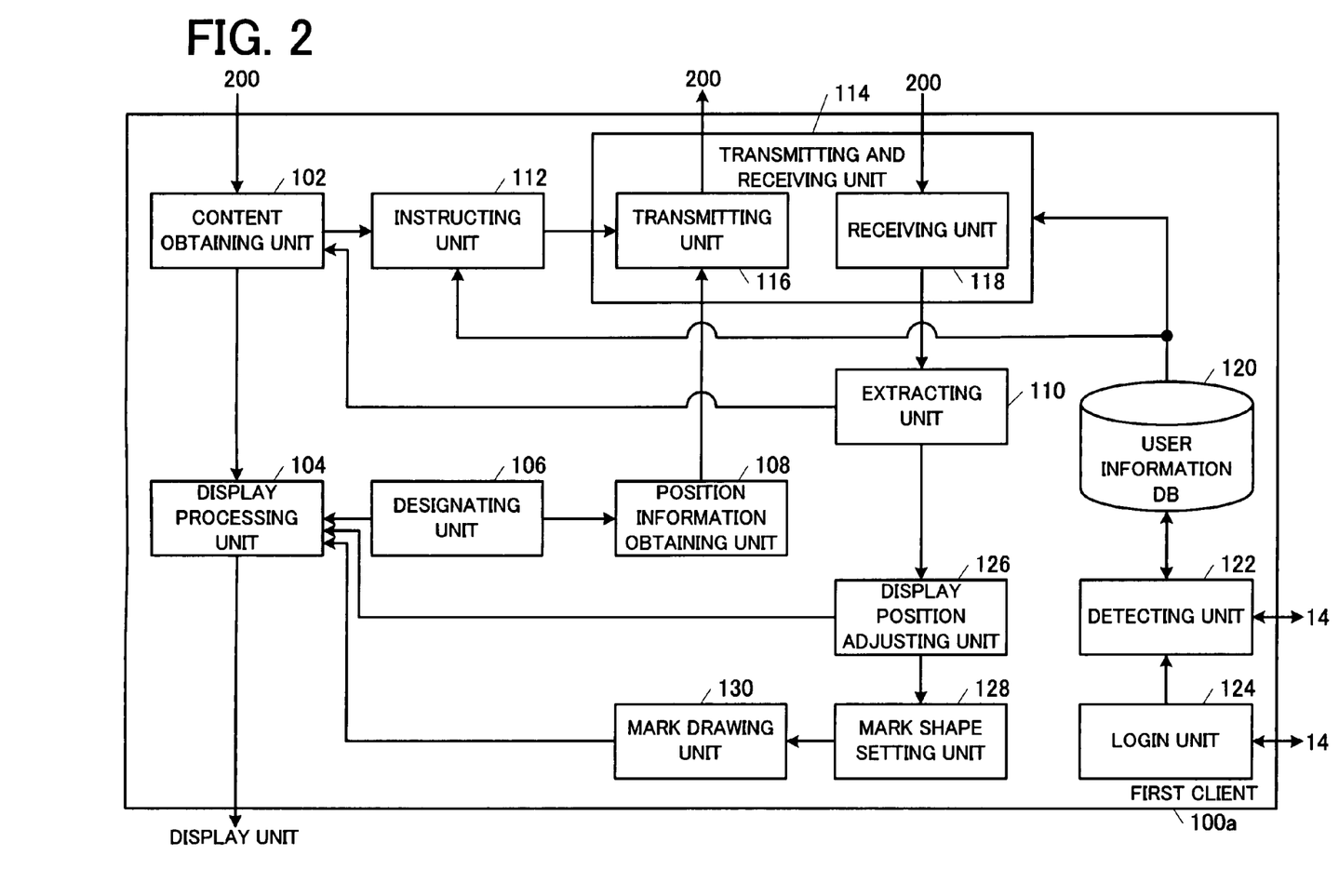
FIG. 2 is a block diagram showing an inner configuration of a first client of FIG. 1.

FIG. 2 is a block diagram showing an inner configuration of the first client 100a of FIG. 1. The second client 100b of FIG. 1 also has the same configuration as the first client 100a.

A login unit 124 establishes a connection with the IM server 14 and executes the login process of the IM service so that the first client 100a obtains an active status. For the login process, the login unit 124 holds identification information for using the IM service (hereinafter referred to as the "login ID") and a password or the like. The information necessary for the login will be referred to as the "login information". The login unit 124 can accept and hold the login information, or it can accept a setting from a manager or the like of the first client 100a. In the case of supporting a plurality of IM services, the login unit 124 holds login information for each of the IM services.

A user information database 120 holds information regarding users of the content providing system 10 and information indicating whether or not each of the users has logged into the IM server 14, in other words, whether or not each of the users is in the active status.

After the login has been completed by the login unit 124, a detecting unit 122 queries the IM server 14 as to whether or not each of the users held in the user information database 120 is in the active status.

First, a description will be made of a configuration relating to the transmission of position information for a cursor or the like that is pointed by a user operating the device.

A content obtaining unit 102 obtains content from the content providing device 200 according to an instruction of the user and outputs the content to a display processing unit 104.

The display processing unit 104 displays the content in a display unit. The content obtaining unit 102 supplies an instructing unit 112 with information that specifies the content (hereinafter referred to as the "content identification information"), such as a file name and a Uniform Resource Locator (URL) of the obtained content.

The instructing unit 112 accepts a designation of a user who holds a meeting by using the content specified by the content identification information supplied from the content obtaining unit 102 (hereinafter referred to as the "target user"). For example, the target user can be designated by a login ID of the target user. To accept a designation of a target user, for example, the instructing unit 112 can refer to the user information database 120 and display a screen for selecting a user from users under the active status. Alternatively, the instructing unit 112 can display a screen having an input box for a login ID.

The instructing unit 112 generates an instant message including the login ID of the target user and the content identification information. Then, the instructing unit 112 sets the content providing device 200 as a destination of the instant message and outputs the instant message to a transmitting unit 116.

The transmitting unit 116 transmits the instant message. For example, a command for holding a meeting (hereinafter referred to as the "setting command") is added to the instant message, and the login ID of the target user and the content identification information are set as arguments of the setting command. Accordingly, the first user can notify the content providing device 200 with the content to be used for the meeting and the target user, i.e., the second user.

After the meeting has been started, when the content obtaining unit 102 obtains new content, in other words, when using different content in the meeting, the instructing unit 112 adds content identification information of the new content to an instant message. Then, the instant message is transmitted by the transmitting unit 116. For example, a command for obtaining the content (hereinafter referred to as the "obtaining command") is added to the instant message, and the content identification information is set as an argument of the obtaining command.

A designating unit 106 accepts an operation of a user via an input device such as a mouse and according to the operation, the first cursor 22 is displayed on the content.

For example, when receiving a transmission instruction of position information from the user, a position information obtaining unit 108 obtains the position information of the first cursor 22 on the content from the designating unit 106. The position information obtaining unit 108 generates an instant message including the position information. The position information obtaining unit 108 sets the content providing device 200 as a destination of the instant message and outputs the instant message to the transmitting unit 116.

The transmitting unit 116 transmits the instant message to the content providing device 200. For example, a command for displaying a cursor (hereinafter referred to as the "position command") is added to the instant message, and the position information is set as an argument of the position command.

Next, a description will be made of a configuration relating to the reception of position information of a cursor or the like as instructed by another user. A receiving unit 118 receives an instant message from the content providing device 200. There are two types of instant message: an instant message that includes content to be browsed, i.e., an obtaining command, and an instant message that includes a position command designating a position of a cursor.

An extracting unit 110 extracts a command included in an instant message. When an obtaining command is included in an instant message, the extracting unit 110 instructs the content obtaining unit 102 to obtain content specified by the content identification information set as the argument of the obtaining command. In accordance with the instruction, the content obtaining unit 102 obtains the content from the content providing device 200 and supplies the obtained content to the display processing unit 104.

Accordingly, when an obtaining command is included in the instant message received by the receiving unit 118, a screen display can be changed automatically. That is, the contents displayed at the first client 100a and the second client 100b can be synchronized.

When a position command is included in an instant message, the extracting unit 110 outputs the position information to a display position adjusting unit 126. When a cursor is displayed in accordance with the position information, the display position adjusting unit 126 adjusts a display position of the content so that a user can visually confirm the cursor. For example, when the content is larger than a display area of the display unit, the user adjusts the display position of the content by using a scroll bar or the like. It can be assumed that the display position of the content differs for each user, and there are cases in which a position of the cursor of the first user is hidden in the screen of the second user. To prevent such a case, the display position adjusting unit 126 is provided. After adjusting the display position, the display position adjusting unit 126 supplies the position information to a mark shape setting unit 128.

The mark shape setting unit 128 sets a mark shape, which is a shape of the cursor, according to a transmitter of the position information. Accordingly, for example, when having a meeting with a plurality of users, the mark shape can be changed for each of the users and the cursors can be displayed. The mark shape setting unit 128 outputs the position information and the mark shape to a mark drawing unit 130.

The mark drawing unit 130 draws the mark shape designated by the mark shape setting unit 128 on a position specified by the position information supplied from the mark shape setting unit 128. Accordingly, a display screen like the display screen 20 or the display screen 30 of FIG. 1 can be generated.

Figure 3:
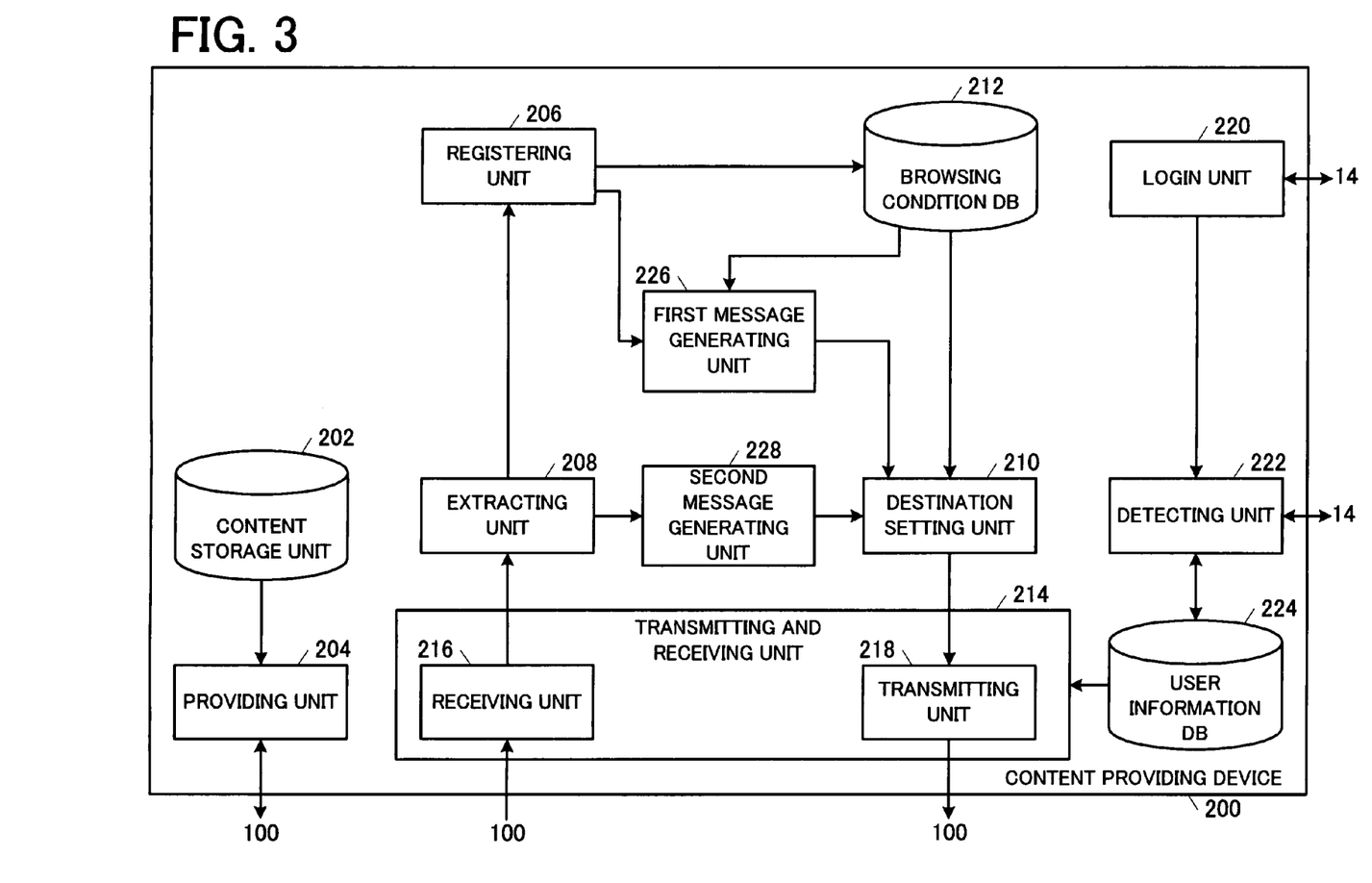
FIG. 3 is a block diagram showing an inner configuration of a content providing device of FIG. 1.

FIG. 3 is a block diagram showing an inner configuration of the content providing device 200 of FIG. 1.

A login unit 220 establishes a connection with the IM server 14, executes a login process of the IM service so that the content providing device 200 obtains an active status. For the login process, the login unit 220 holds login information. The login unit 220 can hold the login information in advance or can accept a setting from a manager or the like of the content providing device 200. In the case of supporting a plurality of IM services, the login unit 220 holds login information for each of the IM services.

A user information database 224 holds information pertaining to users of the content providing system 10 and information indicating whether or not each of the users has logged in the IM server 14, in other words, whether or not each of the users has an the active status.

After the login has been completed by the login unit 220, a detecting unit 222 queries the IM server 14 as to whether or not each of the users held in the user information database 224 is under the active status.

A content storage unit 202 stores content.

A providing unit 204 loads the content stored in the content storage unit 202 and provides the content according to a request from the first client 100a or the second client 100b (hereinafter referred to as the "client 100").

A receiving unit 216 receives an instant message from the client 100 and supplies the received instant message to an extracting unit 208. As described above, an instant message includes one of a setting command, an obtaining command and a position command. When the instant message includes a setting command, the extracting unit 208 outputs to a registering unit 206, a login ID of the target user and the content identification information set as argument of the setting command. When the instant message includes an obtaining command, the extracting unit 208 outputs to the registering unit 206, the content identification information set as argument of the obtaining command.

The registering unit 206 associates the login ID of the target user with the content identification information and stores it in a browsing condition database 212. When obtaining these pieces of information as the argument of the setting command, the registering unit 206 stores these pieces of information as a new record in the browsing condition database 212. When obtaining the content identification information as the argument of the obtaining command, the registering unit 206 updates the content identification information of the already registered record.

The browsing condition database 212 holds content identification information and a login ID of a target user. The number of target users can be two persons or more than one person. When more than one person is designated as the target users, the obtaining command and the position command are notified to all of the designated target users. Accordingly, it becomes possible to hold a meeting between two persons or more.

The registering unit 206 instructs a first message generating unit 226 to generate an instant message including an obtaining command.

The first message generating unit 226 loads newly registered or updated content identification information from the browsing condition database 212 and generates an instant message added as an argument of the obtaining command. The first message generating unit 226 outputs the instant message to a destination setting unit 210.

The destination setting unit 210 obtains a login ID of the target user from the browsing condition database 212 and sets the obtained login ID as a destination of the instant message. Then, the destination setting unit 210 instructs a transmitting unit 218 to transmit the instant message which has a set destination. The transmitting unit 218 transmits the instant message to the client 100.

When a position command is included in an instant message received by the receiving unit 216, the extracting unit 208 outputs to a second message generating unit 228, position information set as the argument of the position command. The second message generating unit 228 generates an instant message including a position command with the position information as the argument and outputs the instant message to the destination setting unit 210.

The destination setting unit 210 obtains a login ID of a target user from the browsing condition database 212 and sets the obtained login ID as a destination of the instant message. Then, the instant message is transmitted from the transmitting unit 218. Accordingly, an instant message including an obtaining command or a position command is notified to the client 100.

Second Embodiment

In a second embodiment, content added with a cursor (hereinafter referred to as the "additional content") is newly generated and each client displays the additional content. A structure having the same reference numeral as the already described structure has the same or approximately the same function and operation as the already described structure. For each of the drawings to be described below, the description will focus mainly on new structures.

Figure 4:
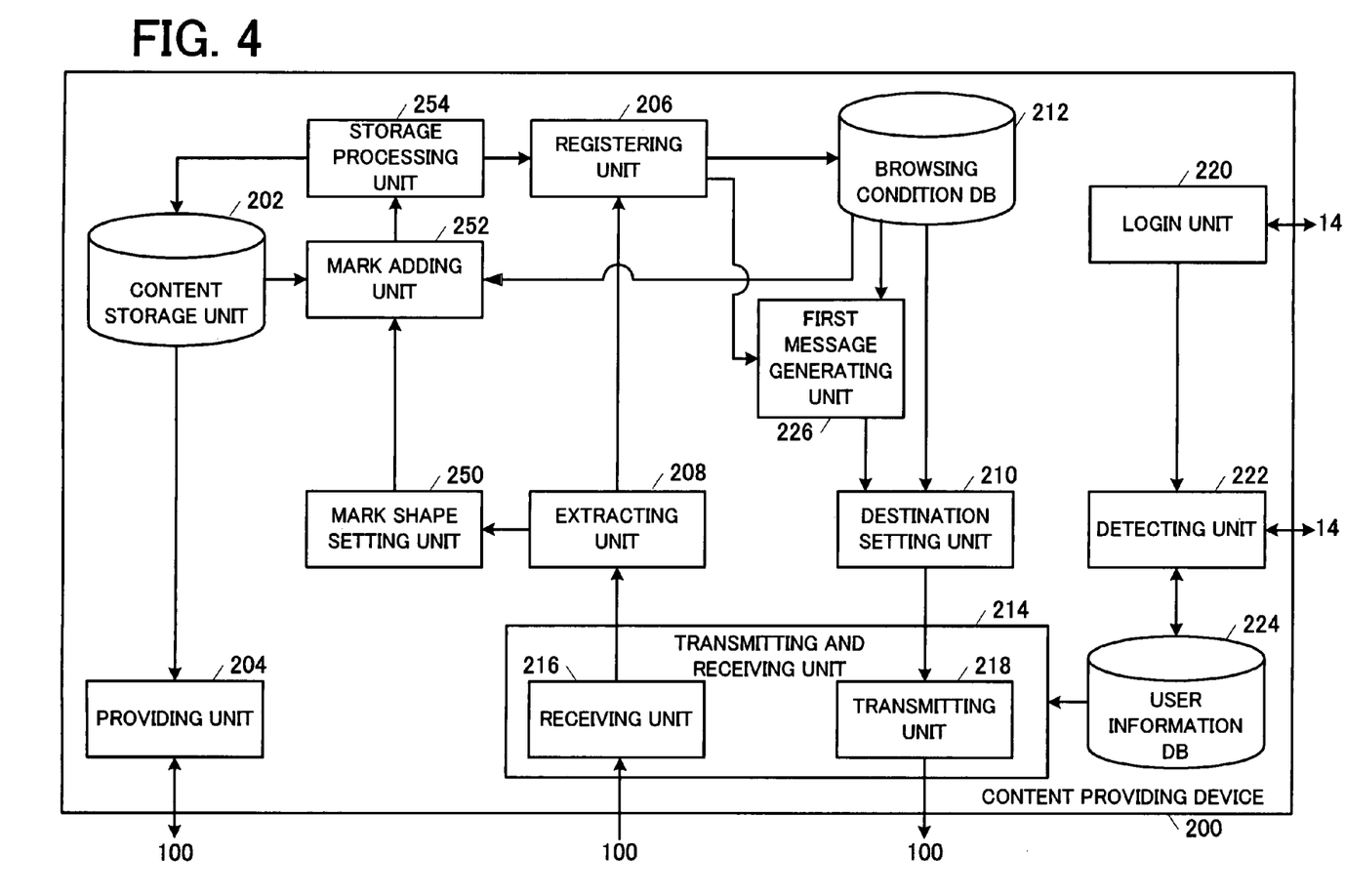
FIG. 4 is a block diagram showing an inner configuration of a content providing device according to a second embodiment of the present invention.

FIG. 4 is a block diagram showing an inner configuration of a content providing device 200 according to the second embodiment.

An extracting unit 208 extracts position information from an instant message and outputs the position information to a mark shape setting unit 250.

The mark shape setting unit 250 sets a mark shape according to a transmitter of the instant message.

A mark adding unit 252 refers to a browsing condition database 212 to load content identification information, and loads content specified by the information from a content storage unit 202. Then, the mark adding unit 252 draws a mark having a mark shape supplied from the mark shape setting unit 250 at a position on the content specified by the position information, and generates additional content which is new content.

The mark adding unit 252 supplies the generated additional content to a storage processing unit 254.

The storage processing unit 254 stores the additional content in the content storage unit 202 and outputs the content identification information of the content to a registering unit 206.

For updating purposes, the registering unit 206 copies data held in the browsing condition database 212 into the content identification information. The registering unit 206 instructs a first message generating unit 226 to generate an instant message including an obtaining command having the content identification information of the additional content as an argument. Accordingly, the instant message including the content identification information of the additional content is transmitted to the client 100.

Figure 5:
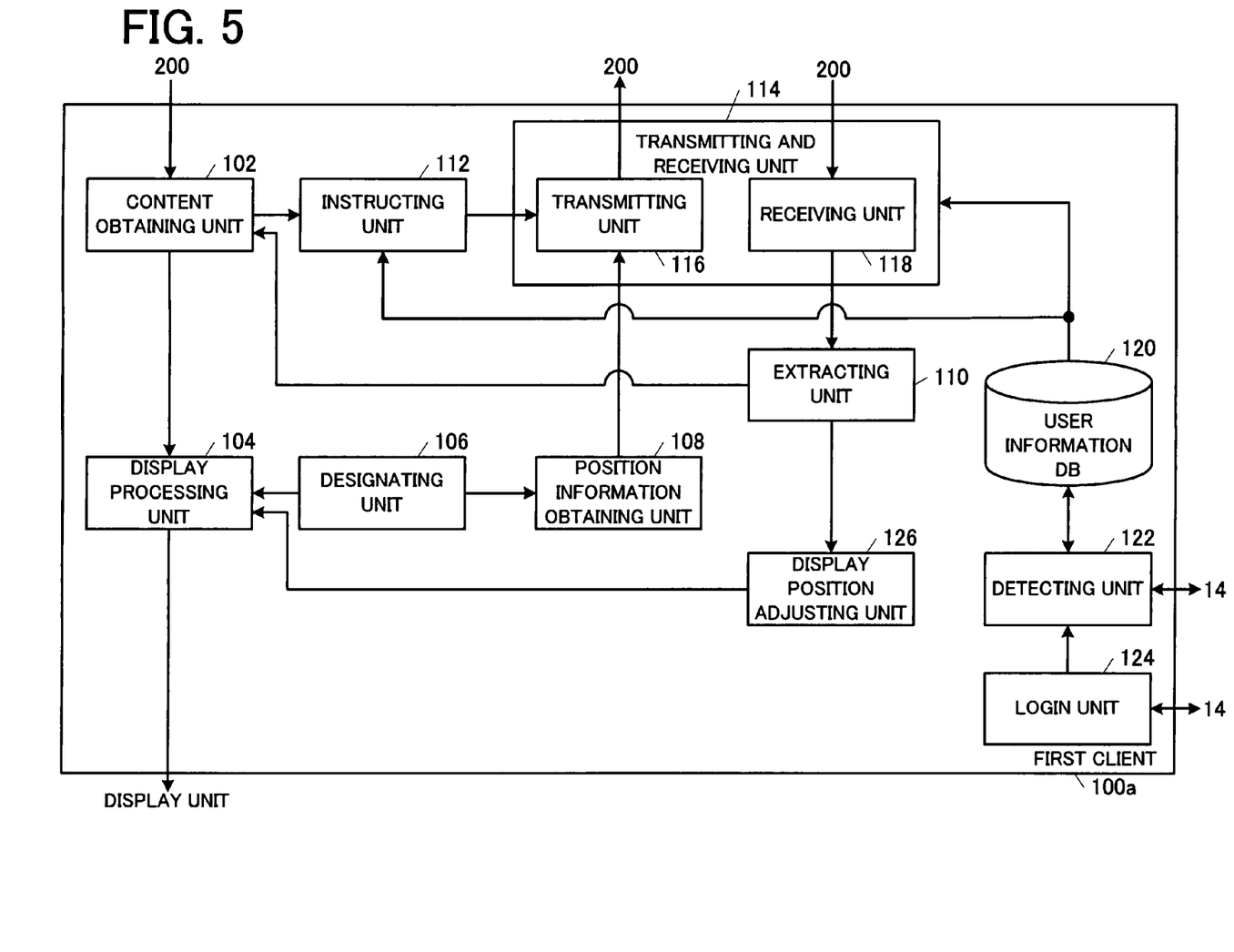
FIG. 5 is a block diagram showing an inner configuration of a first client according to the second embodiment of the present invention.

FIG. 5 is a block diagram showing an inner configuration of a first client 100*a* according to the second embodiment.

An extracting unit 110 extracts content identification information from the instant message including the obtaining command and outputs the content identification information to a content obtaining unit 102.

The content obtaining unit 102 obtains content specified by the content identification information. Accordingly, the additional content added with a cursor is displayed.

The present invention has been described in the form of preferred embodiments. The embodiments are examples and it is to be understood by those skilled in art that there are variations to combinations of each of the constituent elements and each of the processes and those variations also fall within the scope of the present invention. For example, each device of the content providing system 10 can transmit and receive an obtaining command and a position command according to various communication protocols such as the HTTP and not only the IMPP.

What is claimed is:

1. A content providing device comprising:
a providing unit that provides prescribed content to a first client device;
a receiving unit that receives a first message from said first client device including position information which specifies a prescribed position of a cursor on the content at said first client device;
an extracting unit that extracts the position information from the first message; and
a transmitting unit that transmits a second message including the extracted position information to a second client device that is browsing the content,
wherein the position information is extracted from the second message and displayed at the second client device, and
wherein the first and second messages are instant messages that are transmitted according to the Instant Messaging and Presence Protocol (IMPP).

2. The content providing device according to claim 1, further comprising:
a browsing condition database that holds content identification information which identifies the content and a login ID of a client;
wherein in accordance with the message received by the receiving unit, content identification information of the content and a login ID of a client are registered in the browsing condition database.

3. The content providing device according to claim 1, further comprising:
a browsing condition database that holds content identification information which identifies the content and a login ID of a client;
wherein the transmitting unit sets a destination of the message in accordance with the browsing condition database.

4. A content browsing device comprising:
a content obtaining unit that obtains desired content from a providing device that provides content;
a display unit that displays the obtained content and a cursor movable according to an instruction of a user of the content browsing device;
a position information obtaining unit that obtains position information of the cursor on the content; and
a transmitting unit that adds the position information to a message and transmits the message to the providing device wherein the position information is processed, at the providing device, to display the cursor at the providing device,
wherein the message is an instant message that is transmitted according to the Instant Messaging and Presence Protocol (IMPP).

5. The content browsing device according to claim 4, wherein when receiving a transmission instruction from a user, the position information obtaining unit obtains position information of the cursor on the content.

6. The content browsing device according to claim 4, further comprising:
a user information database that holds information indicating whether another user is under active status.

7. A content browsing device comprising:
a content obtaining unit that obtains prescribed content from a providing device which provides content;

a receiving unit that receives a message including position information from the providing device wherein the position information includes a position of a cursor on the content at the providing device;

an extraction unit that extracts the position information from the received message; and a display unit that displays the cursor on the content in accordance with the position information, wherein the message is an instant message that is transmitted according to the Instant Messaging and Presence Protocol (IMPP).

8. The content browsing device according to claim 7, further comprising: a display position adjusting unit that adjusts a display position of the content with the mark.

9. The content browsing device according to claim 7, further comprising:

a mark shape setting unit that sets a shape of the mark according to a transmitter of the position information.

10. A content providing device comprising:

means for providing prescribed content to a first client device;

means for receiving a first instant message from said first client device including position information that specifies a prescribed position of a cursor on the content at said first client device;

means for extracting the position information from the first instant message; and means for transmitting a second instant message including the extracted position information to a second client device that is browsing the content, wherein the position information are extracted from the second instant message and displayed at the second client device, and wherein the first and second instant messages are transmitted according to the Instant Messaging and Presence Protocol (IMPP).

11. A content browsing device comprising:

means for obtaining desired content from a providing device that provides content;

means for displaying the obtained content;

means for displaying on the content, a cursor movable according to an instruction of a user of the content browsing device;

means for obtaining position information of the cursor on the content; and means for adding the position information to an instant message and transmitting the instant message to the providing device wherein the position information is processed, at the providing device, to display the cursor at the providing device, wherein the instant message is transmitted according to the Instant Messaging and Presence Protocol (IMPP).

12. A content browsing device comprising:

means for obtaining prescribed content from a providing device that provides content;

means for receiving an instant message including position information from the providing device wherein the position information includes a position of a cursor on the content at the providing device;

means for extracting the position information from the received message; and means for displaying the cursor on the content in accordance with the position information, wherein the instant message is transmitted according to the Instant Messaging and Presence Protocol (IMPP).

* * * * *

UNITED STATES PATENT AND TRADEMARK OFFICE
CERTIFICATE OF CORRECTION

| | | |
|---|---|---|
| PATENT NO. | : 7,631,049 B2 | Page 1 of 1 |
| APPLICATION NO. | : 10/810594 | |
| DATED | : December 8, 2009 | |
| INVENTOR(S) | : Yoshifumi Tanimoto | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1366 days.

Signed and Sealed this

Second Day of November, 2010

David J. Kappos
*Director of the United States Patent and Trademark Office*